Figure 1:
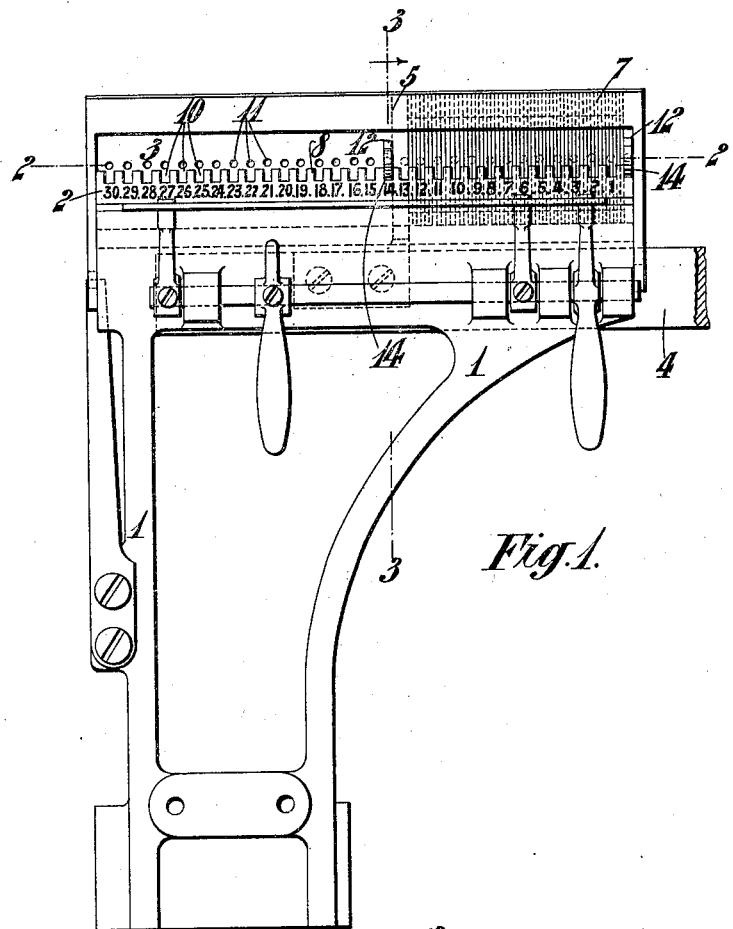

J. G. HOLBOURNS & H. A. LONGHURST.
MEANS FOR JUSTIFYING TABULAR MATTER IN TYPOGRAPHICAL COMPOSING MACHINES.
APPLICATION FILED NOV. 19, 1907.

934,403.

Patented Sept. 14, 1909.

5 SHEETS—SHEET 1.

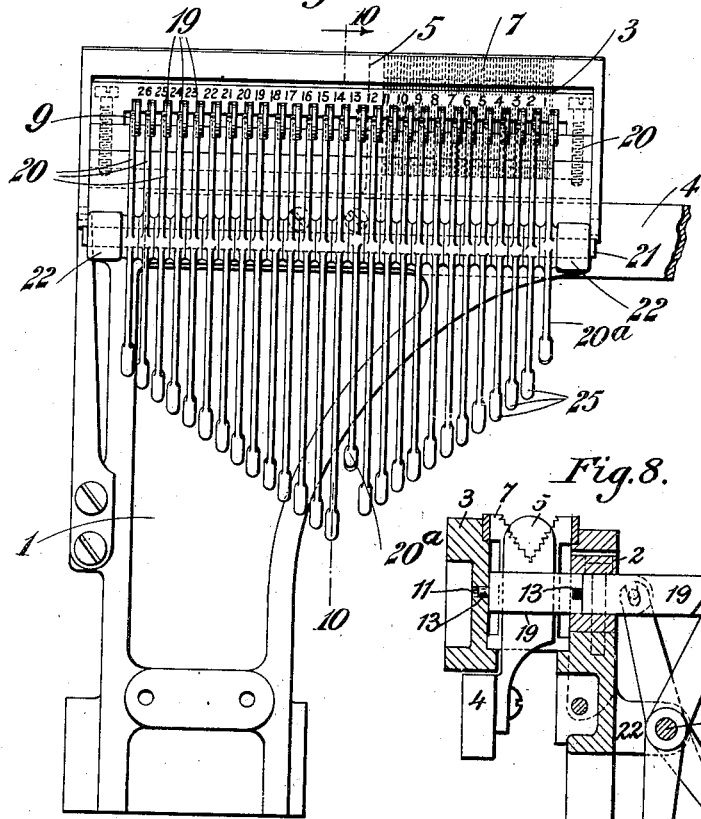
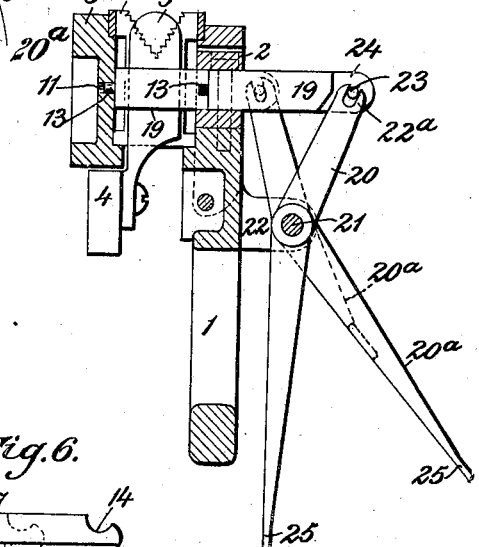
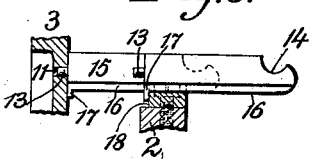

J. G. HOLBOURNS & H. A. LONGHURST.
MEANS FOR JUSTIFYING TABULAR MATTER IN TYPOGRAPHICAL COMPOSING MACHINES.
APPLICATION FILED NOV. 19, 1907.

934,403.

Patented Sept. 14, 1909.
5 SHEETS—SHEET 4.

Witnesses

Inventors
John Glennie Holbourns
Henry Alexander Longhurst
per Chas. Woodroffe
Attorney

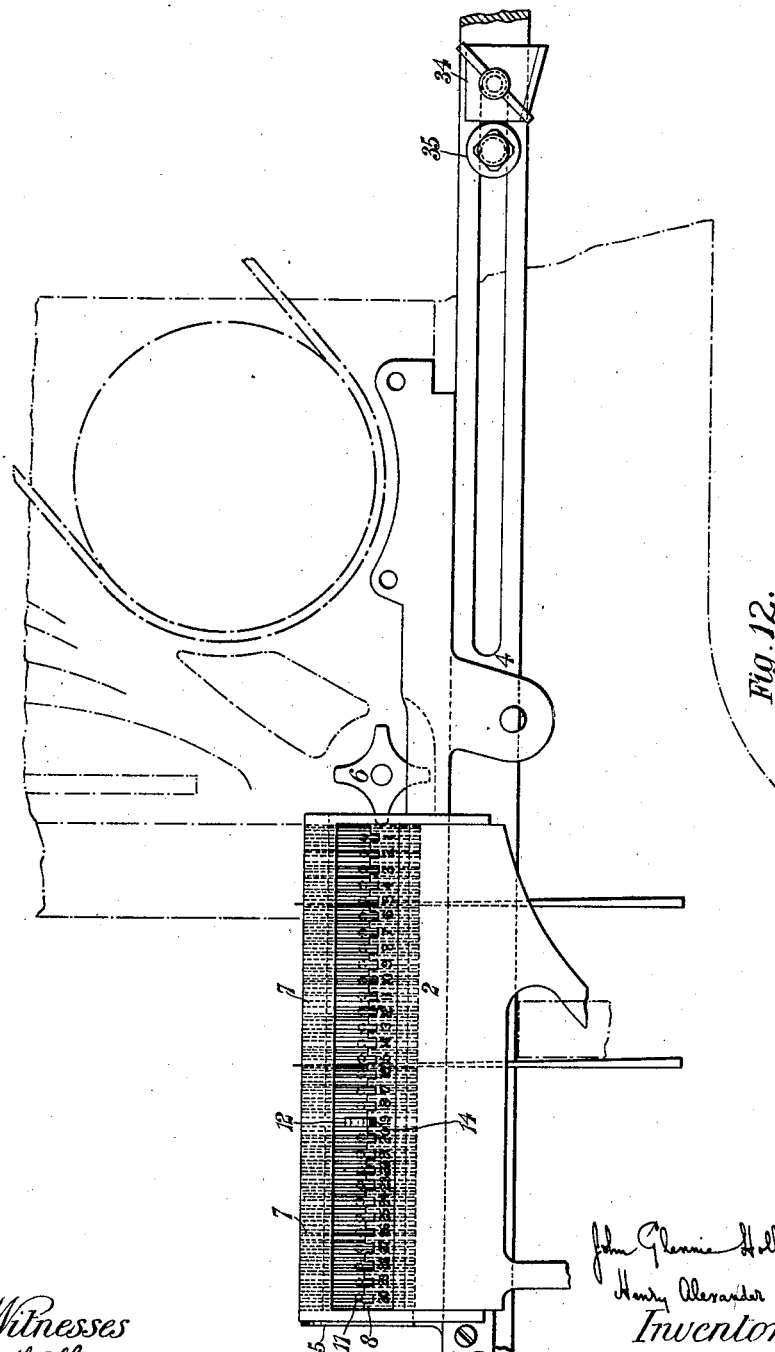

UNITED STATES PATENT OFFICE.

JOHN GLENNIE HOLBOURNS AND HENRY ALEXANDER LONGHURST, OF LONDON, ENGLAND, ASSIGNORS TO LINOTYPE AND MACHINERY LIMITED, OF LONDON, ENGLAND, A COMPANY.

MEANS FOR JUSTIFYING TABULAR MATTER IN TYPOGRAPHICAL COMPOSING-MACHINES.

934,403.  Specification of Letters Patent.  Patented Sept. 14, 1909.

Original application filed July 15, 1907, Serial No. 383,755. Divided and this application filed November 19, 1907. Serial No. 402,852.

*To all whom it may concern:*

Be it known that we, JOHN GLENNIE HOLBOURNS and HENRY ALEXANDER LONGHURST, subjects of the King of the United Kingdom of Great Britain and Ireland, and residing at 188 Fleet street, in the city of London, England, have invented a new and useful Improved Means for Justifying Tabular Matter in Typographical Composing - Machines, of which the following is a specification.

Tabular matter is, as far as the present invention touches it, characterized by the fact that each line of it consists of short lengths, technically known as measures, arranged in parallel columns, all the measures in each column registering at both ends with each other in a vertical sense.

The justification of an ordinary line in a linotype machine, consists in thickening each of the space bars in the line, and this thickening makes all the elements of the line, whether space bars or matrices, move more or less to the right or to the left. Consequently, it is impossible to tell when a matrix of any intermediate word has been assembled, at what distance it will stand from either end of the justified line.

Tabular matter requires a system of justification which will confine the justification movement of the elements—matrices or matrices and space bars—of each measure, to within the length, as well as to within the position, of that measure, otherwise the above mentioned registration in a vertical sense would not be secured.

The present invention consists in an improved means for justifying tabular matter in typographical composing machines, and is a division from pending application Serial Number 383,755, filed July 15th 1907. It exactly meets the requisition stated in the preceding paragraph and is also exceedingly simple. In carrying it into effect, there must be two abutments in the assembler or part of the machine where the matrices and space bars that make up the line, are assembled and said abutments, according to this invention, are retractable from their operative positions but not removable from the assembler. This assembler consists essentially of a pair of horizontal and parallel bars, and the line is assembled between them. It is known as the assembler box, the assembler elevator, place of assemblage, and so forth, according as to whether it is movable or fixed. Both abutments are adjustable as to position in the assembler. One of them is capable of being positioned in front of the measure and the other one after it, speaking in terms of the direction of assemblage. The well known yielding resistant which is pushed along the assembler by the first matrix in the line as the latter lengthens, may be used as one of these abutments. Both are held in or to the assembler at a distance apart equal to the length of the measure to be justified or to that length plus that of the measure or measures already justified. The unjustified measure is justified manually by inserting quads and the abutment or both of them withdrawn from the assembler. This is repeated for each measure in the line. When the last measure has been dealt with and the last abutment withdrawn, the operator has a line of measures each justified within its own length and position, and, therefore, a justified line.

The accompanying drawings form part of this specification and are to be read therewith.

Figure 2:
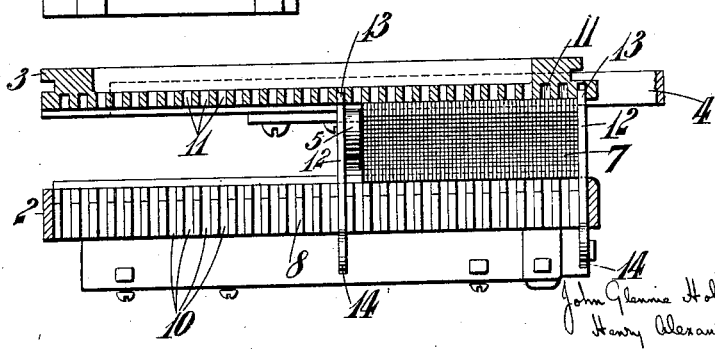
Figure 9:
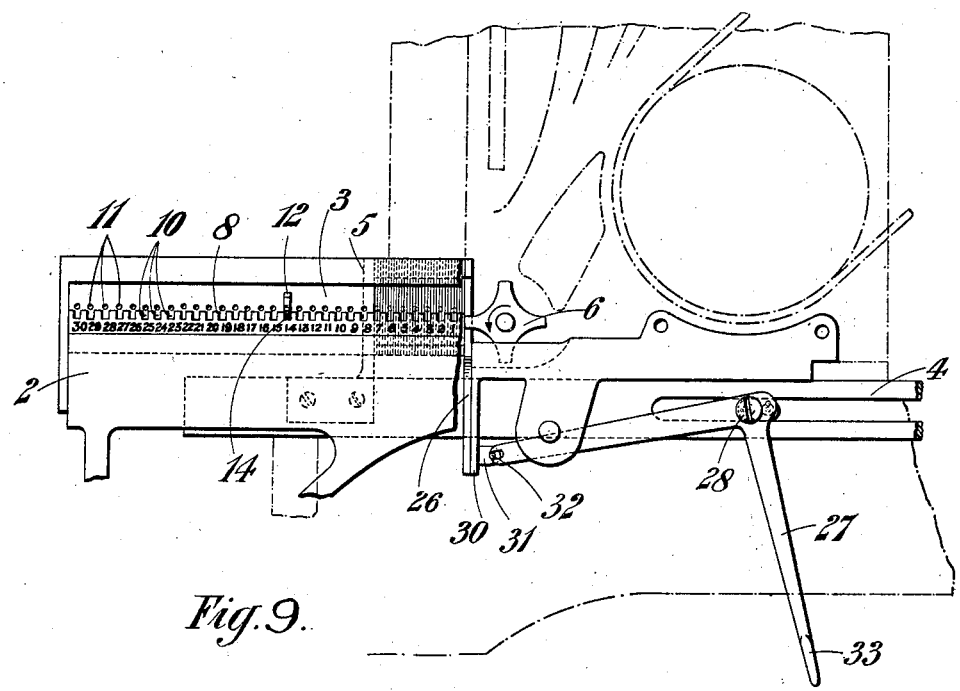
Figure 10:
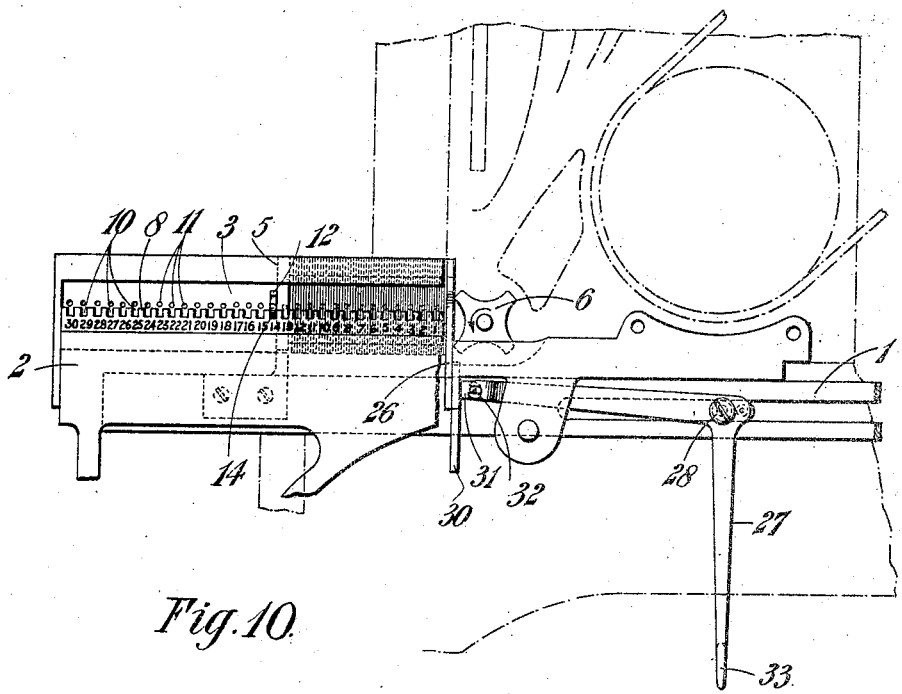
Figure 11:
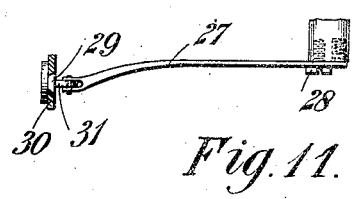

Figure 1 is a front elevation showing one modification of the invention and its use in the assembler elevator of a two letter Mergenthaler linotype machine of the commercial pattern; Fig. 2, a horizontal section on the line 2—2 of Fig. 1; Fig. 3, a rear elevation and Fig. 4, a side elevation of a retractable abutment; Fig. 5, a detail front elevation and Fig. 6, a transverse section, illustrating the use of retractable abutments; Fig. 7, a front elevation and Fig. 8, a section on the line 10—10 of Fig. 7, showing the use of a further modification of the invention in the assembler elevator of a single letter Mergenthaler linotype machine of the commercial pattern; Fig. 9, a front elevation showing the use of a further modification of the invention on the same machine, the measure being partly assembled; Fig. 10, a front elevation showing the same measure justified; Fig. 11, a plan of the retractable abutment and its actuating lever, of Figs. 9 and 10; and Fig. 12, a front elevation showing the use of a further modification of the invention, likewise on the same machine.

1 is the assembler elevator; 2, 3, the pair of horizontal parallel bars above mentioned; 4, the assembler slide bar capable of motion lengthwise in both directions; 5, the yielding resistant above mentioned, fast to the slide 4. When the operator begins to compose, the resistant 5 is up to the assembler wheel 6 with its right hand face flush with the entrance of the assembler elevator 1. As the matrices 7 pass the wheel 6, one by one, the rotation of the latter drives them into the said elevator through its entrance, after which they move horizontally between the bars 2, 3, the first matrix pushing the resistant 5 before it. So far, each part and motion just mentioned are as heretofore.

The present invention applies a scale of printer's units to both the front and rear bars of the assembler, the two scales registering with each other. The front one, i. e., the one next to the operator, is so positioned with reference to the line being assembled, that it shall be legible to him, and the first matrix in the line, coöperates with it in the same way as a moving index with its scale. Each pair of units—one on each scale—is of such a form that the abutments—being retractable from their transverse operative positions in the assembler as distinguished from the yielding resistant which moves lengthwise of the assembler and within it—can be temporarily held rigidly thereto in their respective operative positions, by being passed through the front bar 2 and having their rear ends engaged in the rear bar 3. The scale on the front bar 2 consists conveniently of a rack 8 in the bottom edge of the slot 9 in the said bar—Fig. 1. There may be combined with this rack 8, another one in the top edge of the said slot, with its teeth and notches 10 respectively opposite those of the rack 8—Figs. 7 and 8. The scale on the rear bar 3 consists conveniently of a row of holes 11, each hole opposite the respective notch 10. The scale on the front bar 2 is shown as numbered from the entrance mouth as 0, or from a point as near to it as possible. For instance, the assembler box of a Mergenthaler machine has, near each end, a vertical screw (shown in dotted lines in Figs. 7 and 8) and these screws prevent the scales extending close up to the ends. But if these screws are dispensed with, as shown in Figs. 1 and 2, 9, 10 and 12, the scales can be continued up to both ends, the 0 coinciding with the entrance.

To enable the construction of retractable non-detachable abutment, the subject of the present invention, to be readily understood, it is well to first of all refer to the detachable elements 12, Figs. 1 and 2 which are the subject of the said pending application, for, excepting as to their non-detachability the abutments of the present invention are constructed and operate or function similarly to the detachable abutments 12. Each detachable abutment is a short bar 12. A convenient thickness is half a unit, the notches 10 having a corresponding width. The teeth of the rack 8 are of the same width as the notches, so that the joint width of a tooth and a notch is equal to one unit. The rear end of an abutment 12 has a pin 13 to engage in a hole 11, all the pins being of the same size and shape and all the holes 11 of a corresponding size and shape. An abutment 12 is long enough to project beyond the front bar 2 when its pin 13 is in a hole 11, far enough to be easily taken hold of, the front end preferably terminating in a hook 14 to facilitate its insertion in and withdrawal from the assembler. The resistant 5 has heretofore been of any thickness suitable for its purpose as such. In connection with the present invention it is desirable that this thickness be one unit, for then the operator can, by inserting the left hand abutment at one unit to the left of the length of the measure, counting from zero, make the said abutment stop the resistant at the moment when the respective measure is assembled. Thus, referring to Fig. 1, the justified length of the first measure being 12½ units the left hand abutment is inserted in the notch, or left half, of the 14th unit, thereby setting off a distance of 13½ units between it and 0. A detachable abutment 12 is inserted in the assembler by being pushed rearward through the proper notch 10 until its pin 13 is engaged in the corresponding hole 11. With the left hand abutment, half a unit thick and the resistant 5, one unit thick, the distance set off between the latter and the right hand abutment, is always fractional, the fraction being half a unit. To provide for integral distances being set off, either the resistant 5 is one unit and a half thick or the left hand abutment is thickened on its right hand side to one unit, so as to be flush with the right hand side of the tooth standing to the right of it when it is inserted in the assembler.

Two abutments are necessary for the justification of a measure by the present invention, and as only one measure is justified at a time, only two abutments are required for one assembler. But the yielding resistant 5 may be made to do duty as one of them, in which case only one abutment 12 would be required. This use of the resistant 5 is illustrated in Fig. 12 and specified farther on. Apart from it, the smallest number of abutments is two—one for each end of a measure.

According to this invention the abutments are only retractable from between the bars 2 and 3 as distinguished from being retractable and detachable from the assembler, although it is the same thing practically as far as the act of justifying a measure is concerned. But the substitution of retractability only for retractability and detachability necessitates the provision of one abutment for each unit.

A simple form of the present invention is illustrated in Figs. 3 to 6. According to this construction, each abutment 15 has a dovetailed bottom edge 16, and a stop 17 at the rear end of the said edge to engage with the rear face of the front bar 2 when the abutment is retracted, the said face having a recess 18 wide enough from rear to front to not only receive the stops 17 but to also allow of the pins 13 being withdrawn out of the path of the matrices 7, as will appear from a comparison of Fig. 6 with Fig. 8. The notches in the bar 2 are dovetailed to correspond with the dovetailed edges 16 of the abutments 15.

According to the modification illustrated in Figs. 7 and 8, each retractable abutment 19 is rectangular in cross section, and has its front end loosely connected to the top of a lever 20 fulcrumed upon a rod 21 carried by brackets 22, 22, fast on the assembler elevator 1 and projecting to the front. The connection between lever top and abutment end is of any suitable kind that will allow of the rocking of a lever 20 on its fulcrum, inserting and retracting the respective abutment 19. The one illustrated consists of a notch 22ª in the lever top, embracing a stud 23 projecting laterally from the thinned front end 24 of the abutment.

25 is a thumb bit on the bottom end of each lever 20 by which the operator can insert or retract the respective abutment 19. The levers 20ª are those of the two inserted abutments.

Acording to the modification illustrated in Figs. 9 to 11, the left hand abutment is a detachable one 12, while the right hand one 26, is vertical instead of horizontal and works in the plane of the 0 of the two scales. Further, it is retractable from its justifying position instead of being detachable from the assembler. It is inserted and retracted by a finger lever 27 fulcrumed on the machine frame at 28. The abutment 26 is guided by a dovetail 29 fast on its side and which slides in a correspondingly slotted and independently supported piece 30. 31 is a lug projecting from the dovetail 29 and loosely connected with the coöperating end of the lever 27. This connection is of any suitable kind. It is shown as consisting of a notched fork on the lever end, embracing a pin 32 projecting from each side of the lug 31. 33 is a thumb bit on the opposite end of the lever by which the operator can conveniently rock it to insert and retract the abutment 26.

All the modifications above described are used in the following way, beginning with the first measure. We will assume that the justified length of this measure is 12½ units. The operator starts with the assembler clear of all abutments 12, 15, 19 or 26, they all being at that moment withdrawn (detached or retracted as the case may be), and inserts a detachable abutment 12 or a retractable abutment 15 or 19 in the notch of the 14th unit in the scale, thus establishing a clear distance of 13½ units between the abutment just inserted and the one that will be inserted in the 0 position, the excess of one unit over the length of the measure, being the one unit thickness of the resistant 5. He then assembles the matrices 7 of the measure and inserts a detachable abutment 12 or a retractable one 15 or 19 or the retractable one 26, in the 0 notch, and justifies the measure by inserting quads until the entire distance between the two abutments is filled. Both abutments are then withdrawn. One is inserted farther along the scale to the left according to the length of the second measure, and the assembling of this and its justification proceeded with in exactly the same way as described for the first measure. When the last measure in the line has been justified and the abutments withdrawn, the operator has the justified line already described. The quads above mentioned are non-expanding. Expanding spacers such as the Mergenthaler double wedge space bar may be used with the present invention to justify a single measure, but only one measure in a line can be so justified, and it must always be the same measure throughout the job that has a space bar inserted in it. Thus, if the operator inserts a space bar in the third measure in the first line, he must restrict the insertion of space bars to the third measure in all the succeeding lines of the job. If he does not, he will upset the register of the measures of one line with the measures of the other lines. He may, if he chooses to, leave room between any two measures for one or more space bars of the kind just mentioned, but only between one pair of adjacent measures in each line, and all such space bars must be in a like position in all the lines of the job, or the above mentioned register will be upset. These space bars are justified by the machine in the usual way.

The modification illustrated in Fig. 12 is characterized by the use of the resistant 5 as the left hand abutment and a detachable abutment 12 for the right hand abutment of the first and succeeding measures excepting the last one. With this modification, the operator assembles the matrices of a line in the assembler, leaving room for the insertion of the abutment 12, and pushes the resistant 5 to the limit of its travel to the left, in which position the block 34 on the right hand end of the slide 4 will be up to the independently supported and fixed stop 35. He next inserts the abutment 12 in the proper notch on the right hand of the first measure, counting the units of the latter from the left hand end of the scale, and justifies that measure in the way already described between the resistant 5 and the abutment 12. He then withdraws the abutment 12 and after pushing the matrices of the second measure up to the now justified first one, inserts the abutment 12 in the proper notch on the right hand of the second measure, counting the units of its length from the right hand end of the first measure, and justifies this second measure likewise in the way already described. The last measure receives one or more space bands which are justified by the machine in the usual way.

It is obvious that the abutments 15 might have been shown in Fig. 12 in place of abutments 12, and that abutments 15 might have been read throughout this paragraph in place of abutments 12 without departing from this invention.

It is to be noted that the present application for patent does not claim abutments which are detachable bodily from the assembler as distinguished from those that are connected permanently to the assembler and are also retractable from their operative positions therein, for we have made such excluded abutments the subject of a separate application S. N. 383755 filed July 15th 1907.

We claim,

1. The combination in a typographical composing machine of two parallel bars constituting the assembler thereof; an abutment movable across the space between said bars, means on said bars adapted to operatively and temporarily support said abutment transversely of said assembler at a selected point; and arresting means on said abutment coöperative with said assembler in the retracted position of said abutment.

2. The combination in a typographical composing machine, of two parallel bars constituting the assembler thereof, a scale on each bar, the two scales registering with each other; an abutment operatively connected to the assembler at each end of a measure assembled therein one of them retractable from its operative position in the assembler; and arresting means on the last named abutment coöperative with said assembler in the retracted position of said abutment.

3. The combination in a typographical composing machine, of two parallel bars constituting the assembler thereof; a scale of notches on one bar; a scale of holes in the opposite bar registering with the scale of notches, a plurality of retractable abutments insertible into said notches at given points; means on said abutments for engaging said holes at said given points in the operative position of said abutments; and arresting means on said abutments coöperative with said assembler in the retracted position of said abutments.

4. The combination in a typographical composing machine of two parallel bars constituting the assembler thereof, a row of notches in one bar constituting a scale of printers' units; a row of holes in the opposite bar registering with the row of notches and constituting a second scale of printers' units; a plurality of retractable abutments insertible into said notches at given points; means on said abutments for engaging said holes at said given points in the operative position of said abutments; and arresting means on said abutments coöperative with said assembler in the retracted position of said abutments.

5. The combination in a typographical composing machine, of two parallel bars constituting the assembler thereof; a row of notches in one bar constituting a scale of printers' units; a row of holes in the opposite bar registering with the row of notches and constituting a second scale of printers' units; a plurality of retractable abutments insertible into said notches at given points; means on said abutments for engaging said holes at said given points in the operative position of said abutments; arresting means on said abutments coöperative with said assembler in the retracted position of said abutments; and means for moving said abutments into and for retracting them from said operative position.

6. The combination in a typographical composing machine, of two parallel bars constituting the assembler thereof; a scale of printers' units on each bar, adapted to have abutments operatively and temporarily held thereto transversely of the assembler; two retractable abutments adapted to be so held to the said assembler; and arresting means on said abutments coöperative with said assembler in the retracted position of said abutments.

7. The combination in a typographical composing machine, of two parallel bars constituting the assembler thereof; a scale of printers' units on each bar said scales being adapted to engage with and operatively and temporarily support abutments transversely of the assembler, two retractable abutments adapted to be engaged with any two pairs of units in the said scales; and arresting means on said abutments coöperative with said assembler in the retracted position of said abutments.

8. The combination in a typographical composing machine, of two parallel bars constituting the assembler thereof; a scale of printers' units on each bar adapted to operatively and temporarily engage with and support abutments transversely of the assembler; a retractable abutment adapted to be engaged and supported by any pair of units in said scales; and arresting means on said abutment coöperative with said assembler in the retracted position of said abutment.

9. The combination in a typographical composing machine, of two parallel bars constituting the assembler thereof; a scale of printers' units on each bar adapted to operatively and temporarily engage with and support abutments transversely of the assembler; one abutment adapted to be so engaged and supported by any pair of units in the said scales above 0; a retractable abutment adapted to be so engaged and supported by the 0 pair of units; and arresting means on the first named abutment coöperative with the assembler in the retracted position of said abutment.

10. The combination in a typographical composing machine, of two parallel bars constituting the assembler thereof; a scale of printers' units on each bar adapted to operatively and temporarily engage with and support abutments transversely of the assembler; one abutment adapted to be so engaged and supported by any pair of units in the said scales above 0; a retractable abutment adapted to be so engaged and supported by the 0 pair of units; arresting means on the last named abutment coöperative with the assembler in the retracted position of said abutment; and means operatively connected with the last named abutment for moving said abutment to and retracting it from its operative position.

In witness whereof we have hereunto set our hands in the presence of two witnesses.

JOHN GLENNIE HOLBOURNS.
HENRY ALEXANDER LONGHURST

Witnesses:
WARWICK HY. WILLIAMS,
THOMAS J. BLAKER.